Dec. 2, 1958

B. COX ET AL 2,863,137

TAPE-SPACING SYSTEM

Filed Feb. 5. 1957

INVENTORS.
BONNAR COX
JACOB GOLDBERG
BY
Lyon Lyon
ATTORNEYS.

Dec. 2, 1958

B. COX ET AL 2,863,137

TAPE-SPACING SYSTEM

Filed Feb. 5, 1957

INVENTORS.
BONNAR COX
JACOB GOLDBERG
BY
ATTORNEYS.

Dec. 2, 1958  B. COX ET AL  2,863,137

TAPE-SPACING SYSTEM

Filed Feb. 5, 1957  6 Sheets—Sheet 5

INVENTORS.
BONNAR COX
JACOB GOLDBERG
BY
ATTORNEYS.

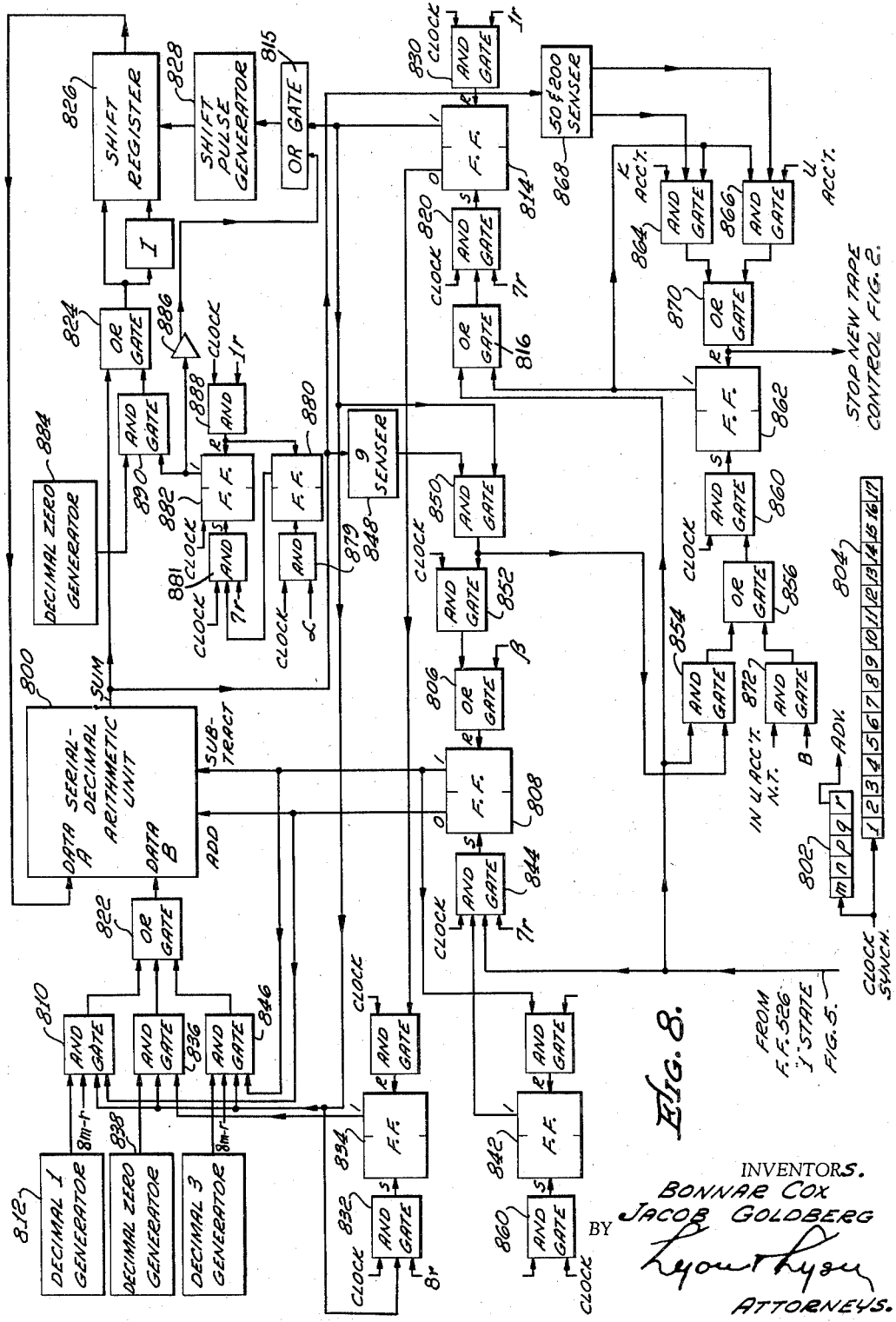

United States Patent Office 2,863,137
Patented Dec. 2, 1958

2,863,137

TAPE-SPACING SYSTEM

Bonnar Cox and Jacob Goldberg, Palo Alto, Calif., assignors, by mesne assignments, to General Electric Company, New York, N. Y., a corporation of New York Application February 5, 1957, Serial No. 638,292

11 Claims. (Cl. 340—174)

This invention is directed to an arrangement for allotting space on one tape for recording future activity based upon information representative of past activity which has been recorded previously on another tape.

The present-day information-handling machines employ as one of the mediums upon which information is recorded therein magnetic tape. Because of the fact that the information recorded on the tape usually is of a type which is to be retained for a considerable time, the magnetic tape is considered as the permanent memory, as opposed to the high-speed "temporary" memories used in the systems, such as magnetic cores, magnetic drums, or storage tubes. In the course of the use of the permanent memory, consisting of magnetic tape, items of information which are to be preserved are usually inserted on the tape at a position along its length wherein it may be associated with other items having some common basis. Thus, if the information-handling machine is an inventory system, the items collected may be for a particular type of merchandise. If the information-handling machine is employed for accounting purposes, then the items collected are in accordance with a particular account. By way of example, for the purposes of performing the accounting for a bank, deposits and withdrawals made by each depositor are collected under the depositor's account number. Since tapes have a finite length, eventually they will fill up, thus causing a condition known as spill-over, where it is not possible to insert further items on the tape in association with the previously collected items in view of the limitations on the space provided. These conditions are sought to be avoided, and, besides, good business practice demands that periodically the permanent memory be emptied and a new permanent memory, or storage file, be made up from the old one for the purposes of handling future business. Thus, again using by way of illustration the banking business, on the average of once every month it is customary to send statements to a depositor indicating the activity and current balance during the preceding month. At this time, a new tape, or storage file, can be made up to handle the future business.

In the making up of such new tape, one approach to providing space allotments for the activity for each account may be to provide a uniform space allotment for each account. Since each account does not have the same activity over a unit interval of time, obviously this is wasteful of both tape and equipment, since it may require a considerable number of tape-transport equipments to handle the amount of tape to record the transactions over an interval of, let us say, a month. If, however, some method of predicting the activity to be expected could be made and space allotments for accounts effected accordingly, not only is it possible to reduce the amount of tape required, but also tape-handling apparatus associated therewith, and, finally, the time required for finding a given account may be reduced considerably. Obviously, such exact prediction is not possible. However, it is possible to predict with a fair degree of accuracy the activity to be expected in the immediate future from the activity which has occurred within a previous interval of time.

An object of the present invention is to provide a novel and useful space-allotment system for recording future activities on a recording medium.

Another object of the present invention is the provision of a unique space-allotment system which allots space for the future recording of item activity on a recording medium, based upon the activity indicated by those associated items in a previous interval of time.

Yet another object of the present invention is the provision of a novel and inexpensive system for allotting space within a memory for the storage of future items or transactions based upon information derived from past activity.

These and other objects of the present invention are achieved by providing apparatus which enables the copying onto a first recording medium from a previously used recording medium of the data whereby a particular account may be identified. Then, responsive to information included in the identification of the account, the following operations may occur. No further space may be allotted, since it is not anticipated that further activity on that account will occur in the next activity period. Alternatively, in anticipation of activity for a new account for which no prior activity information is available, a fixed space may be allotted. Alternatively, in the event the account is an active one, then means are provided for measuring the extent of the previous activity and space is allotted on the new recording medium which is based upon this previous activity and which includes additional room which is a percentage of the space employed for the previous activities. In essence, therefore, the space allotted on the new medium is derived from the data contained on the old medium and is a variable space in accordance with the activity shown on the old tape.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 8 shows a block diagram of the proportionality measuring circuits employed in the embodiment of the invention;

For the purposes of simplifying the explanation of this invention, such explanation will be made in connection with the accounting activities employed in the banking business using magnetic tapes as the recording medium. However, this is not to be construed as a limitation, since it will be readily apparent to those skilled in the art how the spirit and scope of this invention may be extended to include other types of business activity handled by information-handling machines which require the provision of data storage in a medium of the type wherein space must be allotted in advance to receive associated items. This type of storage is here exemplified by magnetic tape, and thus the invention is described in connection with the allotment of space on a new tape for receiving items of data representing future transactions of depositors of the bank. The space allotment is controlled completely from the information found on the old tape which contains a record of the previous activities of the depositors of the bank.

In connection with the banking activity example employed to describe this invention, it should be noted that an "active account" is defined as one which is currently open and activities such as deposits and withdrawals are occurring. Whenever an active account number is written down, the symbol "K" is in association therewith, indicative of that fact. An account which has become inactive, either by reason of being closed out by the depositor or because over a long period of time no activity has occurred, is indicative of the symbol "D," which is in association with the account number wherever written. In current banking practice, if an account has become inactive after some period of time regarded as safe, or if closed out, the account number is reassigned to a new customer. In order to indicate an account number that will be reassigned to the incoming new depositors, a symbol "U" is associated with the account number.

Figure 1:
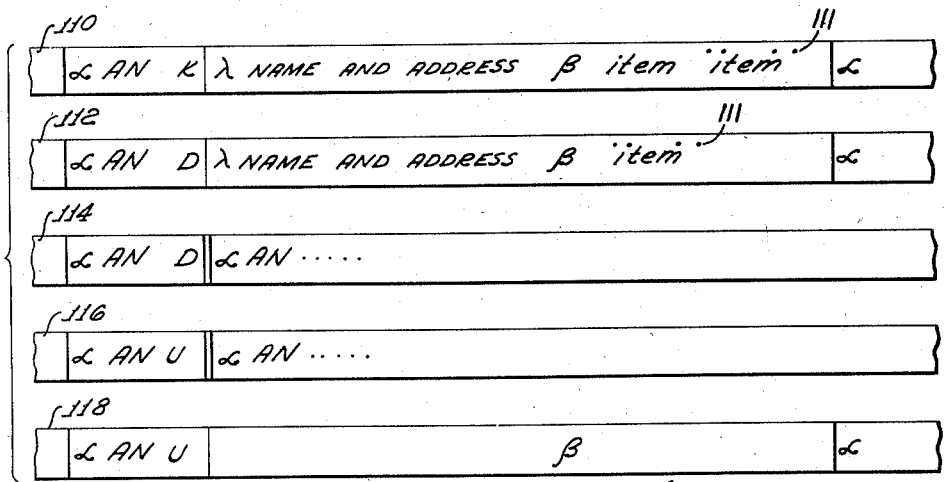
Figure 1 is a representation of old and new recording medium formats employed in the embodiment of the invention.

Reference is now made to Figure 1, which shows a tape format which may be employed for recording the activities of depositors of a bank. In Figure 1 there are shown five tape fragments, 110 through 118. Tape 110 illustrates the information to be found in a section of tape allotted to an active account. In order to facilitate the explanation herein, this data will be shown as if it were written on the tape in human language. It is to be understood that the recording and reading of information on tape occurs in well-known coded manner. Referring to tape 110, at the beginning of each account first there is seen the symbol alpha. The alpha symbol identifies the beginning of the next account. The alpha symbol is always followed by the account number, which is followed by a symbol K, or U, or D, which indicates the type of account which is present. In the tape fragment 110 this symbol is "K," indicative of an active account. Following the account classification symbol, there is found another symbol, lambda. The lambda symbol precedes name and address information for the depositor whose account number is shown. The end of the name and address space is followed by a symbol, beta. The symbol beta designates both the end of the space for recording depositor identification information and the beginning of the space for recording of activity items which belong to that account. Thereafter, the beginning of the space for the next account is indicated by the alpha symbol.

It should be noted that the space between a beta and the succeeding alpha need not be completely filled with items during a month. This is the space which is allotted in anticipation of the activity for that account. It should be noted that the end of the last item in the item space must be identified. This identification may be either by way of an auxiliary track adjacent the data tracks wherein a pulse is recorded at the time the last character of an item is written or may be identified by means of apparatus, known as "Or" gates, which are connected to the reading heads over the tape, which provide an output every time a character is read and do not provide an output when there is no character recording. The preferred arrangement is one wherein an auxiliary track 111 is provided with four pulses effectively bracketing the last item which was written. A system wherein this type of last-item marking is employed is shown, described, and claimed in an application by Jacob Goldberg and Bonnar Cox, filed November 26, 1956, Serial No. 624,308, entitled Magnetic Tape Writing System.

At this time it may be well to define the terminology to be employed herein. In the customary practice employed in the information-handling field, a "word" may mean an alphabetic word or a number; each word is made up of a number of characters; each character is represented by a plurality of binary digits which are recorded on tape in adjacent tracks. Because a binary coded decimal system is employed, in order to distinguish a decimal digit which is represented by several binary digits from a binary digit where the word "digit" is employed, it is intended to mean "decimal digit." Each binary digit will be referred to as a bit, or binary bit. Thus, if a four-bit code is employed to represent each character or each digit, the four-bits will be found, for any given character or digit, in adjacent tracks and adjacent each other. Thus, the tape may have at least four tracks for the data and at least one track in addition adjacent these four, wherein a pulse is positioned adjacent the last digit of an item. In the present invention a seven-bit code is employed. Each item includes a symbol plus or minus, followed by the dollar amounts. The plus or minus, of course, represent a deposit or withdrawal in the account.

Returning now to Figure 1, the tape fragment 112 represents the situation where an active account has become inactive during the course of the month. The symbol "K" has been overridden by the symbol "D." Otherwise, the information within the space allotted for this account number is identical with that shown for the active account. Tape fragment 114 shows the amount of space to be allotted to an inactive account upon the new tape which is made up from the tape for the previous interval. It is seen here that the only space allotted for an inactive account which has become inactive in the preceding interval is just enough to contain the alpha symbol, the account number, and a "D," indicative of the fact that the account is inactive. This is followed by the alpha, which is indicative of the next account number.

Tape fragment 116 indicates the situation when an inactive account has remained inactive for a period sufficiently long to insure that no other transaction will probably occur, and thus the account number is free to be assigned to another customer. Here the "D" symbol has been overridden by a "U" symbol. However, since no new tape has yet been made up, but merely the "D" symbol has been overridden by a "U" symbol, the space which this account number occupies is the same as the space occupied by the inactive account. When a new tape is made up from this tape, as shown by the tape fragment 118, the account number is followed by the symbol "U," which in turn is followed by a fixed space which provides room for the lambda symbol and the name and the address of the depositor to whom this account number will be assigned during the next operating interval. The name and address space is terminated by the beta symbol, which is followed by space for whatever items will be accrued by this particular account number during the next operating interval. Since there is no previous experience for this new depositor, a fixed space is allotted for a "U" account which is to be assigned.

At this time, it should be noted that for an active account, when the new tape is made up, there must be transferred from the old tape the category symbols, the name and address data for the depositor, and the beta symbol. Items are not to be transferred to the new tape. In the case of the "D," or inactive, account, the only information to be transferred to the new tape is the account number and the inactive account symbol. The "U" account will be transferred before assignment in the exact same form as it appears on the old tape. After assignment, the "U" is overwritten with a "K" and it is handled in a manner described previously.

Figure 2:
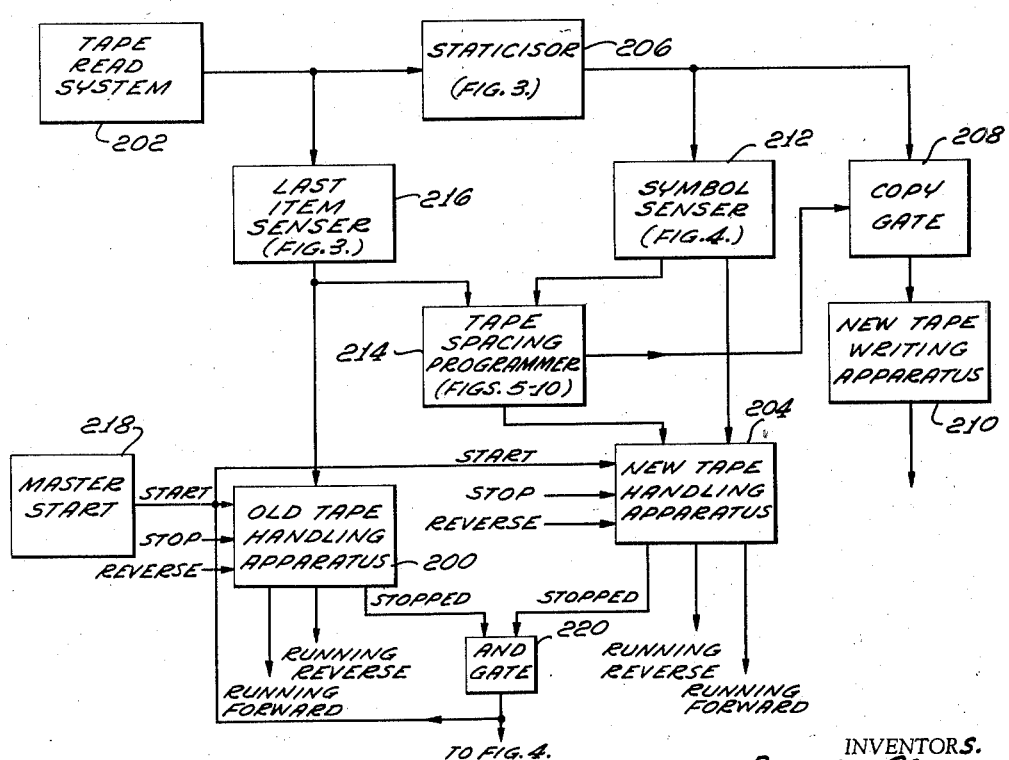
Figure 2 is a block diagram of an embodiment of the invention.

Reference is now made to Figure 2, which shows a block diagram of an embodiment of the invention. In association with the old tape from which a new tape is to be made up, there is required old-tape-handling apparatus 200 and a tape-read system 202. The old-tape-handling apparatus 200, so called to distinguish from the new-tape-handling apparatus 204, merely consists of the well-known apparatus for starting the motion of tape in one or the other direction, or for stopping the motion of tape. This apparatus is well known in the information-handling field and may be purchased commercially. Both the old and new tape-handling apparatus are identical, and each responds to motion commands or stop commands to move or stop the tape accordingly. Each one also provides an output indicative of the command which is being executed. This is indicated by outputs labeled "running forward," "reverse," and "stopped." While any of the well-known and commercially purchasable systems may be employed, a preferred arrangement for this old and new tape-motion apparatus is found described and claimed in an application by Jacob Goldberg and Bonnar Cox for a Control Apparatus, Serial No. 599,089, filed July 20, 1956.

The output of the tape-read system is applied to a staticizer 206, which includes a register. As is well known, the staticizer is the name applied to apparatus which staticizes, or holds for a time, data which is transitory, such as that being read from the magnetic tape which is in motion. The staticizer may comprise a set of flip-flops which are set or reset in accordance with the digital data being received from the tape-read system. The output of the staticizer is applied to a gate 208, which, when enabled, permits the application of the data from the staticizer 206 to be applied to the new-tape-writing apparatus 210. The new-tape-writing apparatus is well-known apparatus consisting of amplifiers and recording heads required for recording in parallel tracks on new tape the data being received from the old tape through the gate 208. The staticizer output is also applied to a symbol senser 212. The function of this circuitry is to sense when a symbol is being read and to provide an output indicative of the symbol which has been read. The symbol-senser output is applied to a tape-spacing programmer 214. The function of this apparatus is to control the new-tape-handling apparatus so that spacing for items is provided in accordance with the rules previously set forth. Also required is a last-item senser 216. This circuitry determines when the last item for the particular account has been read, at which time its output is applied to the tape-spacing programmer 214, to indicate thereto the end of items for a particular account, and is also applied to the old-tape-handling apparatus 200, to instruct it to stop the old tape at the beginning of the next account.

To commence the operation of this system, a master-start pulse is provided from a master-start source 218. Assume that the old tape has been stopped just before the alpha symbol, indicative of a new account. The effect of the master-start pulse, which is applied to both the old and new-tape-handling apparatuses, is to start both tapes running concurrently. The tape-reading system 202 reads the information from the old tape. Its output is applied to a staticizer 206, and from the staticizer to the gate 208. The symbol senser 212 senses the presence of an alpha and opens the gate 208, so that the data being read from the old tape may be transferred directly to the new tape. Should the symbol senser next sense a "D" account, then the new tape apparatus is instructed to stop. The old-tape-handling apparatus will continue to move the old tape until it reaches a position before the next account identified by the next alpha symbol, at which time it also will stop.

An And gate 220, upon receiving inputs from both old and new tape-handling apparatus indicative of the fact that both tapes are stopped, initiates a cycle again, whereby both tapes are run forward together again. This time, if the symbol senser senses either a "U" or a "K" account, the tape-spacing programmer 214 receives the output indicative of this from the symbol senser 212. If a "U" account has been detected, then the tape-spacing programmer functions to permit the new-tape-handling apparatus to move the new tape a fixed distance and then stop. The old-tape-handling apparatus brings the old tape to a position just before the next account commences and stops.

Should the symbol senser 212 have sensed a "K" account, then the old and new tapes continue to run forward together until such time as the last-item senser 216 senses the last item on the old tape which was allotted for the activity for that account. When this occurs, then the old-tape-handling apparatus is instructed to continue moving the old tape until it reaches a position before the next account, at which time it is stopped. The tape-spacing programmer measures the time required for the old tape to be moved from the commencement of the item-recording space which is indicated by the beta symbol to the last item which is sensed by the last-item senser. The tape-spacing programmer then appends to this interval a certain percentage of this interval in accordance with a prearranged percentage. The new-tape-handling apparatus permits the new tape to continue running forward during this additional interval. At the end of this additional interval, the new tape is stopped, whereupon the next cycle of allotting space on the new tape is commenced. It should also be noted here that in the event that an active account exists, signified by the symbol "K", for which no activity has occurred, then a fixed-activity space is allotted nonetheless.

Although any of the tape-reading systems which are well known in the computer field may be employed which use a number of magnetic transducer heads positioned alongside of each other across the magnetic tape, followed by amplifiers, shapers, and other associated required equipment, a system which is preferred is that which is described and claimed in an application for a Magnetic Record Testing Means, by Donald K. Reynolds, Serial No. 393,869, filed November 23, 1953, and assigned to a common assignee. There is also shown in that application a plurality of flip-flop circuits which may be employed as a staticizer. In order to enable the detection of the last item, the block diagram labeled last-item senser 216 is shown in Figure 2. The last item may be sensed in any number of well known ways. One of these is to sense the output of the staticizer, and, in the absence of such output when there ought to be one, provide a signal indicative of this fact. A preferred arrangement is one which senses pulses recorded in an auxiliary track adjacent the last item. When new items are written, the pulses are advanced to be adjacent the last new item written; thus, its location within the item space is identified. A system for writing such pulses each time an item is written is shown, described, and claimed in the above-noted application to Jacob Goldberg and Bonnar Cox for a Magnetic Tape Writing System.

Figure 3:
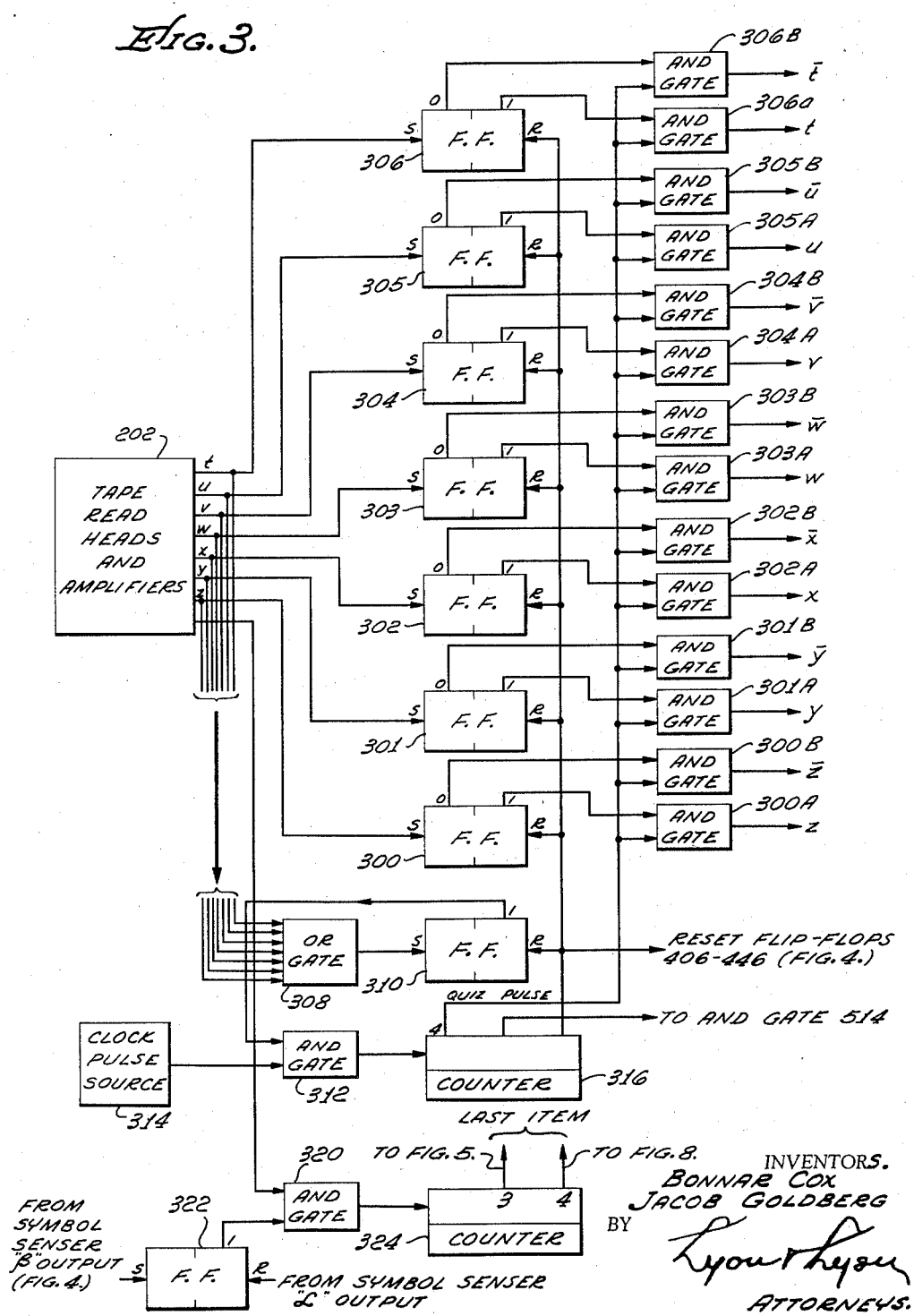
Figure 3 is a block diagram of a staticisor and last-item senser which may be used in the embodiment of this invention.

There are four of these pulses, and therefore the last-item senser may merely comprise a cyclic four-binary-bit counter which is cycled in response to the reading of these four pulses. The circuitry for this is shown in Figure 3. Referring back to Figure 1, tape 110, it may be seen how these four pulses are written on an adjacent track to bracket the last item recorded on the tape.

In order to understand the operation of the symbol senser, which will be shown in Figure 3, it is necessary to establish the symbols which are to be identified. The table shown below indicates the code employed for the symbols with which this invention is concerned. The code, it is to be understood, is only by way of illustration and not to be construed as a limitation upon the invention.

|        | t u v w x y z |
|--------|---------------|
| Alpha  | 0 1 1 1 1 1 0 |
| Beta   | 0 0 0 0 1 0 1 |
| Lambda | 1 1 1 1 0 1 0 |
| D      | 1 1 1 0 1 1 0 |
| U      | 0 0 0 1 0 0 1 |
| K      | 1 1 0 0 0 0 0 |

The small-case letters "t" through "z" indicate the digit positions in the code of the symbols. The presence of a "one" in the digit position can be represented by the small-case letter; the presence of a "zero" in that digit position is represented by the small-case letter with a bar over it. Thus, the symbol alpha can also be designated as $\bar{t}$ u v w x y $\bar{z}$. Beta will be $\bar{t}$ $\bar{u}$ $\bar{v}$ $\bar{w}$ x $\bar{y}$ z.

Figure 3 shows a block diagram of how the staticizer is employed to produce output for each of the binary positions which are representative of the presence or the absence of a binary bit in that position. As described in Figure 2, there is a magnetic reading head over each track, the output of which is amplified and applied to the staticizer which comprises the seven flip-flops 300 through 306. If a one is present in the channel associated with these flip-flops, the flip-flop is set; if a one is not present, then the flip-flop remains in its reset condition. At this time, it should be pointed out that these flip-flops, as well as others to be referred to in the course of this explanation, are the well known two stable state type of circuits. One of these stable states is designated as the set condition and the other is the reset condition. One of the outputs, which is obtained when the flip-flop is in its reset condition, is designated as the zero output; the other of the outputs which is obtained when the flip-flop is in its set condition is designated as the one output. An example of suitable circuitry is shown and described in the text Electronics, by Elmore and Sands, published in 1949 by the McGraw-Hill Book Company, on pages 96–99.

The output leads from the tape-read head and amplifiers 202 are respectively designated from t through z. Thus, if flip-flop 306 is set, its output will be representative of the presence of a one in the "t" digit location, and if it remains reset after reading, then the output is representative of a zero in the "t" digit location. This may be represented by a $\bar{t}$. Flip-flop 300 is associated with the z output from the tape-read apparatus 202, and thus when in its set condition, its output is representative of a "one" in the z digit location; when in its reset condition, its ouput is representative of a zero in the z location, or $\bar{z}$.

As soon as any binary bit is read, then an Or gate 308, which is connected to the t through z outputs of the tape-read heads and amplifiers, applies its output to a flip-flop 310. This flip-flop is set and in that condition can apply its output to an And gate 312. The And gate receives, as its second required input, output from a clock-pulse source 314. The clock-pulse source is the usual source of synchronizing pulses which are employed in any computer to synchronize its operation and may either be pulses derived from a rotating magnetic drum or from an oscillator serving as a synchronizing pulse source for the system. The output of the And gate 312 is applied to a counter 316. This counter may be employed for purposes not pertinent to the explanation herein, such as serializing the data which is now presented in parallel in the staticizer. In the present operation, the counter has a number of counting states, which number may be determined by the spacing between characters on the magnetic tape. This counter must complete its count and be reset before the next character is read. When the counter counts a number of counts sufficient to insure that all the binary bits in a character have been collected and read (thus compensating for the effects of skew of tape) a quiz pulse is emitted from the counter. At the end of the counter count, the output is applied to the staticizer, to reset all the flip-flops, and also to the flip-flop 310, to reset it, and thus block the counter from counting further pulses from the clock-pulse source 314.

The "And gate" and "Or gate" terminology employed refers to well known coincidence and buffer circuits. Suitable circuits are shown and described in the above-noted book Electronics, on pp. 117 et seq.

Referring now to the flip-flops 300 through 306, it will be seen that each flip-flop has its output connected to two And gates. Thus, flip-flop 300 has its outputs connected to And gates 300A and 300B; flip-flop 306 has its outputs connected to And gates 306A and 306B. Every one of these And gates has applied thereto as its second required input the quiz-pulse source from the counter 316. Thus, upon the quiz-pulse source being applied, one or the other of the two And gates associated with each flip-flop will be enabled. The And gate connected to the one output of the flip-flops will produce the one output; and the one connected to the zero output of the flip-flops will produce the zero-representative output.

Figure 4:
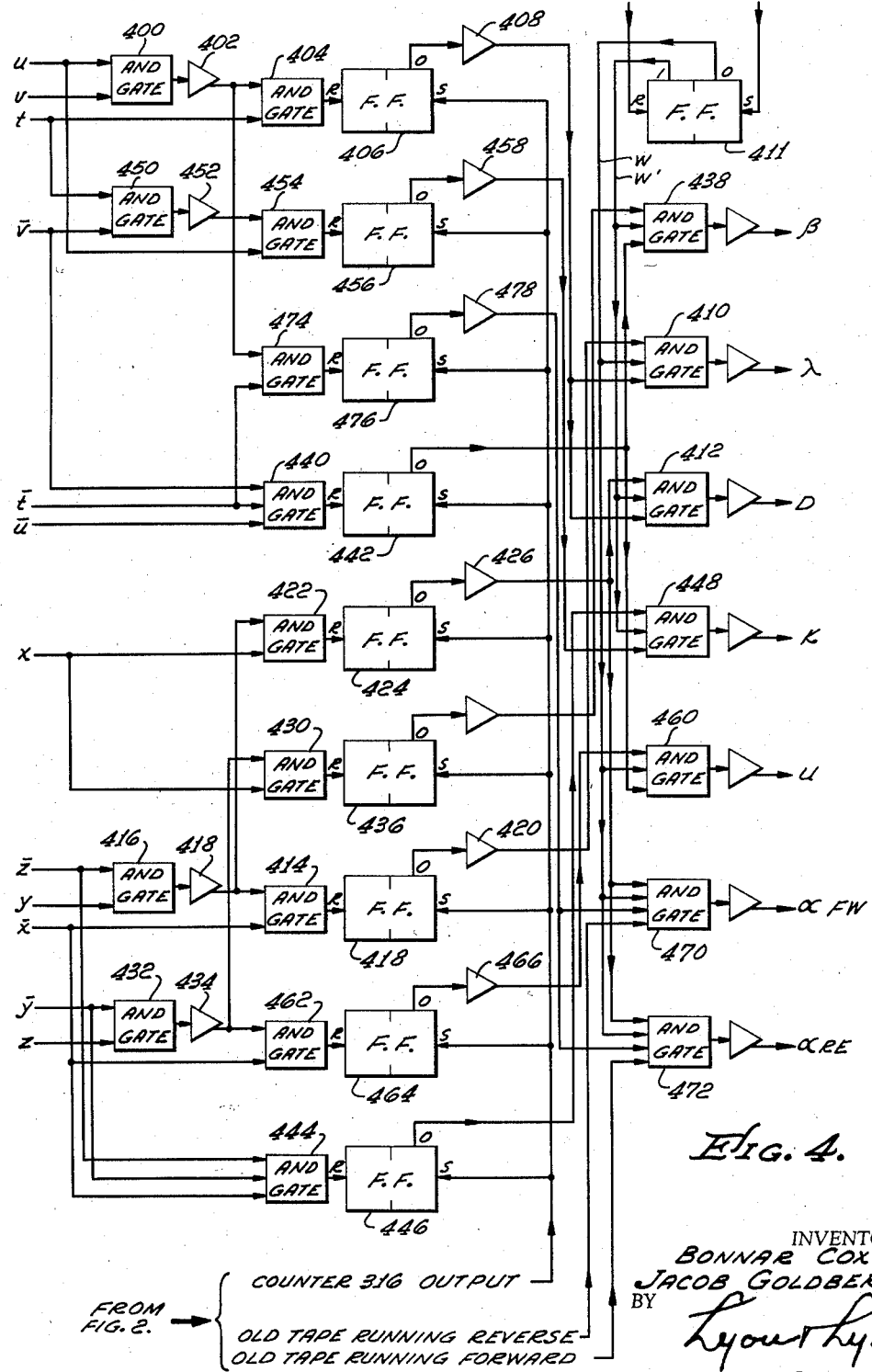
Figure 4 is a block diagram of a symbol senser employed in the embodiment of the invention.

Figure 3 also shows the arrangement whereby the last item may be sensed. As previously pointed out, the last item which has been written in an item-activity space is bracketed by four pulses which are on the adjacent, or eighth, track. This is in accordance with the writing system described and claimed in the application by Goldberg and Cox, as previously noted. Thus, the output of this eighth track is applied to an And gate 320. The second required input to this And gate is applied from the flip-flop 322. This flip-flop is set to provide such output only when a beta output is sensed by the symbol senser which is shown in Figure 4. This flip-flop is reset when an alpha symbol is sensed at the beginning of the next account. A counter 324 receives the output from the And gate 320, which when it is enabled consists of the four pulses which bracket the last item which has been written. These pulses are placed so that the third pulse is opposite the last character of the last-item word and the fourth pulse is opposite the space where the first character of the next item word can be written. Thus, when this counter has completed a count of three, its output signifies that the last item has passed under the reading head on the old tape. When it has counted to four, the tape heads are over the next item space. The next alpha symbol blocks the input to the counter again.

Figure 4 is a block diagram of a symbol senser. Its function is to sense the output of the staticizer and, in response to such sensing, provide an output indicative of the symbol being sensed. The input leads to the symbol senser have, as reference indications, the small-case letters by which the outputs of the And gates 300A, 300B through 306A, 306B are identified. Thus, the interconnection of these leads may be readily understood. In order to avoid any chances of errors, the symbol senser shown in Figure 4 senses not only the presence of ones in the proper binary bit position, but also the presence of zeros. Thus, the input to an And gate 400 consists of the u and v outputs from And gates 305A and 304A. Through a cathode follower 402, the output of the And gate 400 is applied to an And gate 404. The second required input to this And gate is a t input, which is the output of And gate 306A in Figure 3. The output of And gate 404 serves to reset flip-flop 406. Accordingly, flip-flop 406 will be reset when the presence simultaneously of u, v, and t exists. The output of flip-flop 406, when reset, is applied through a cathode follower 408 to two And gates 410 and 412. And gate 410 has as a second required input the w output of a flip-flop 411. This flip-flop is reset by output from And gate 303A and is set by output from And gate 303B. Thus its reset and set outputs respectively correspond to w and $\bar{w}$. The output of And gate 410 is representative of the symbol lambda.

In accordance with the tables previously shown, the lambda requires t u v w x̄ y z̄. The manner of sensing t u v w has just been described. An And gate 414 has applied thereto as one required input the x̄ output of And gate 302B. Z̄ and y, respectively outputs from And gates 301A and 300B, are applied to an And gate 416. The output of the And gate is applied through a cathode follower 418 as the second required input to And gate 414. The output of And gate 414 resets a flip-flop 418. The output of flip-flop 418 is applied to a cathode follower 420 as the third required input to And gate 410. Thus, flip-flop 418 provides an output when x̄, y, and z̄ are sensed.

Considering And gate 412, its output represents the presence of the symbol D. In accordance with the table previously shown, a D symbol may be represented by t u v w̄ x y z̄. The t u v input to the And gate is provided by the output of flip-flop 406. The second input to the And gate is a w̄ input, which is received from the And gate 303B in Figure 3. This still leaves a need for sensing the presence of x y z̄. The x input is applied directly to an And gate 422; the second required input to this And gate is the output of the cathode follower 418, which as previously described is energized when And gate 416, which senses the presence of the y and z̄ inputs, is enabled. Thus, the output of the And gate 422 resets a flip-flop 424, the output of which is applied through a cathode follower 426 as the third required input to the And gate 412. Flip-flop 424 may thus be said to provide an indication by its output of the presence of x, y and z̄.

A beta symbol may be represented by t̄ u v̄ w̄ x ȳ z. An And gate 430 has applied as one required input the output of And gate 302A, which represents x when it is present. The ȳ and z simultaneous presence enables an And gate 432, the output from which is applied through a cathode follower 434 to enable And gate 430. The output of And gate 430 resets flip-flop 436. Thus, the output of flip-flop 436, when reset, represents the simultaneous presence of x, ȳ, and z.

Flip-flop 436 output, when reset, is applied through a cathode follower as one of the required inputs to And gate 438. The second required input to And gate 438 is provided by the w̄ output of the And gate 303B. This leaves to be sensed v̄, ū, and t̄. An And gate 440 has applied thereto the v̄, t̄, and ū outputs of the respective And gates 304B, 305B, and 306B. The output of And gate 440 resets flip-flop 442, whose output therefore is indicative of the simultaneous presence of v̄, t̄, and ū. Flip-flop 442's output is applied to And gate 438, whereby it is enabled to produce an output indicative of the fact that a beta symbol has been sensed.

In sensing the symbol "K," the x̄, ȳ, and z̄ inputs are applied to an And gate 444. Its output is applied to reset a flip-flop 446. Thus, this flip-flop's output is representative of the simultaneous presence of x̄, ȳ, and z̄. The output of the flip-flop is applied to an And gate 448, which has a second required input thereto the w̄ input. The remaining digits to be sensed are t, u, and v̄. The t and v̄ are sensed by an And gate 450, and the output of this And gate is applied through a cathode follower 452 to a second And gate 454. This second And gate has applied thereto the u output of the And gate 305A. The flip-flop 456 is reset by the output of the And gate 454, and therefore its output is representative of t, v̄, and u having been sensed. The output of flip-flop 456 is applied through a cathode follower 458 to provide the third required input to And gate 448. The output of And gate 448 then signifies the fact that a "K" symbol has been sensed.

The "U" symbol is represented by t̄ ū v̄ w x̄ ȳ z. The output of flip-flop 442, as previously described, is representative of t̄, ū, and v̄. Thus, it serves as one input to And gate 460. A second required input to And gate 460 is the w. The remaining inputs which must be applied to this And gate must comprise an input which arises when x̄, ȳ, and z are sensed. As previously described, the output of the cathode follower 434 occurs when the ȳ and z are sensed. This output is applied to an And gate 462. An x̄ input is also applied to this And gate 462, and the output therefrom is applied to reset a flip-flop 464. Thus, the output of flip-flop 464 exists when x̄, ȳ, and z are simultaneously present. The output of the flip-flop 464 is applied to a cathode follower 466 as the third required input to the And gate 460.

The remaining symbol to be sensed is the symbol alpha. It was previously stated that the old tape continued in motion after a last item has been sensed until it comes to rest just before the next account. This next account has its beginning signified by the presence of an alpha symbol on the tape. Obviously, the alpha symbol must be sensed before the information can be given that the reading heads are in the presence of the beginning of the account. Obviously, therefore, the tape cannot be stopped with the reading heads just before the beginning of the alpha. In order to enable this operation, the alpha symbol is sensed and then the old tape is brought to a stop. It is then reversed and the alpha symbol is sensed in reverse, and then the old tape is brought to a stop again. This time, however, the stopping position is just before the alpha symbol signifying the next account. Therefore, in order to perform this operation, it is necessary not only to generate a signal when the alpha symbol is sensed with the tape going in the forward direction, but also to generate a symbol when the alpha symbol is sensed while the tape is running in the reverse direction.

An alpha symbol "going-forward" and an alpha symbol "going-in-reverse" are sensed by this symbol senser. It is obvious that the alpha symbol will appear the same, regardless of the direction of motion of the tape, since it is represented by seven binary bits which exist substantially adjacent one another in parallel tracks on the tape. However, the additional information that the tape is going forward or the tape is going in reverse enables the separation of the alpha symbol into alpha-forward or alpha-reverse. These signals, namely, going-in-reverse or going-forward, are provided by the old-tape-handling apparatus and indicate the operation being performed by the tape-handling apparatus.

The alpha symbol is manifested by t̄ u v w x y z̄. The output of flip-flop 424 is indicative of x y z̄ having been sensed, and this output is applied as one input to an And gate 470 and an And gate 472. An And gate 474 is employed to sense the simultaneous presence of t̄, which provides one input, and u and v, which provide the second input as the result of the output of the cathode follower 402. Flip-flop 476 is reset and its output manifests the fact that ū, v̄, and t̄ have been sensed.

The output of flip-flop 476 is applied through a cathode follower 478 to the two And gats 470 and 472 as their third required inputs. The fourth required input to And gate 470 is the going-forward signal from the old-tape-handling apparatus, the fourth required input to enable And gate 472 is the going-reverse signal from the old-tape-handling apparatus.

Flip-flops 406, 456, 476, 442, 424, 436, 418, 464, and 446 are all set by counter 316 output after each tape period character. Flip-flop 411 needs no resetting since it will assume a condition indicative of w or w̄ as required.

It should therefore become apparent from the previous description that the symbol senser will energize the selected one of several leads when the symbol sensed by the logic in the symbol senser is the one to be represented by that selected lead, and that the lead is uniquely representative of the character being read by the reading heads during the current character period.

Figure 5:
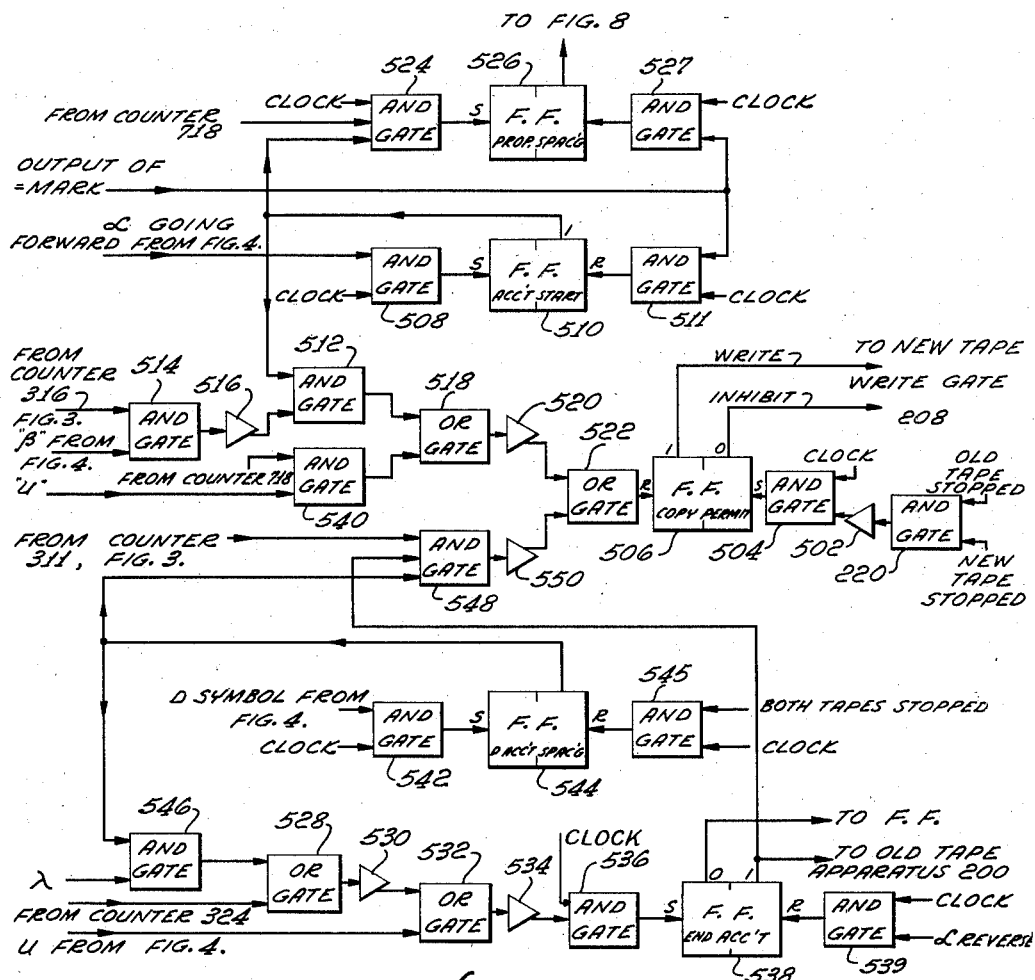
Figure 5 is a block diagram of an arrangement of the program flip-flops employed in the embodiment of the invention.

Figure 5 is a block diagram of some of the programming logic which is required in the embodiment of the invention. Assume that in the beginning both old and new tapes are stopped. The old tape has been stopped so that its reading heads are positioned just before the alpha symbol for the next account for which tape space is to be allotted on the new tape. The new tape is stopped at a position from which the tape-space allotments will commence. Output indicative of the fact that the old end new tapes have stopped is provided by the old and new tapes-control apparatus as shown in Figure 2. This is sensed by an And gate 220, which applies its output through a cathode follower 502 to another And gate 504. The second And gate 504 is enabled upon receiving the next clock pulse from the master clock source 314 for the system. Flip-flop 506, which may be designated as a copy-permit flip-flop is then set. The old and new tapes start running forward together again. The output from flip-flop 506 is applied to the writing gates 208 to permit the data being read from the old tape through the staticizer 206 to be transferred onto the new tape by means of the new-tape-writing apparatus 210. The new tape will then have recorded on it from the old tape an alpha symbol, the account number, and the symbol representative of the classification of the account.

The first symbol which is sensed as the old tape runs forward is the alpha symbol. This alpha symbol, plus a signal indicative of the fact that the old tape is going forward received from the tape-control system as detected by the symbol senser is applied to an And gate 508. Upon the occurrence of the next clock pulse, this And gate is enabled to set a flip-flop 510. The output of this flip-flop, when in its set condition, is applied to another And gate 512. This And gate has as its second required input a signal indicative of the fact that a beta symbol has been sensed. This signal is provided by the output of an And gate 514, which has as one input the output of the symbol senser indicative of the sensing of the beta and a second input, the output of the counter 316 at a suitable counting state after the beta has been sensed by the symbol senser to insure a slight delay time for writing a new beta symbol.

The output of And gate 514 is applied to And gate 512 through a cathode follower 516. The output of And gate 512 is applied to an Or gate 518, the output from which is applied to another cathode follower 520. The output of cathode follower 520 is applied to an Or gate 522, the output from which is applied to reset flip-flop 506. It is thus seen that in the case of a "K" account, the copy-permit flip-flop 506 is set to the condition in which it will permit copying of the data on the old tape, consisting of the alpha symbol, account number classification symbol, and name and address of the account. A beta symbol generator shown subsequently herein is actuated to write a beta after the name and address at the proper location. The copy-permit flip-flop 506 is reset by output received shortly after reading beta. The reset output is applied to inhibit the copy gates 208.

The output of a counter 718, which occurs at a short interval after the beta symbol has been written, is applied to an And gate 524. This And gate receives as a second required input the output of the account-start flip-flop 510, which it will be recalled was set when the alpha symbol was sensed. The third required input to And gate 524 is a clock pulse, whereupon the flip-flop 526, which may be termed the proportional spacing flip-flop, is energized. The output of this flip-flop is employed to control the apparatus which performs the proportional spacing operation. This flip-flop, in effect, indicates by its output that the item-activity space on the old tape and on the new tape has commenced.

As the old and new tapes continue running forward, the end point of the activity for the particular account on the old tape will be reached. As is shown in Figure 3, this is indicated by the third-count output of counter 324. The output of counter 324 is applied to an Or gate 528, the output from which is applied through a cathode follower 530 to a second Or gate 532. The output of this Or gate is applied through a cathode follower 534 to an And gate 536. The And gate, upon receiving a second input consisting of a clock pulse, sets a flip-flop 538, which may be termed an end-account flip-flop. The one output of this end-account flip-flop is employed to instruct the old-tape-speed-control apparatus to continue running forward until the next alpha symbol is read, then to stop, then to reverse until the alpha symbol is read going in reverse, and then to stop again. At this point, the old-tape-speed-control apparatus maintains the old tape stopped until the proportional spacing routine for the next account is initiated.

The combination of the alpha and going-forward output of the symbol senser, plus the output of flip-flop 538, in its set condition, are used to instruct the old-tape apparatus to stop the old tape and then to reverse it. The combination of the output from the symbol senser of the alpha symbol going in reverse, plus the one output of this flip-flop combine to instruct the old tape control apparatus to bring the told tape to a complete stop. This will be just before the alpha symbol for the succeeding account.

When an account appears on the old tape, which is the "U" classification, flip-flops 506 and 510 will be set, as previously recited. Thus, the account number and the classification symbol are copied from the new tape to the old tape. Space must be allotted for insertion of the name and address of the depositor when this account number is assigned to a new depositor, as well as some space for the expected item activity. The "U" symbol from the symbol senser is applied to the Or gate 532, which operates in the manner previously described to enable And gate 536 to set flip-flop 538. Since the space for the account number, classification symbols, and name and address data is a fixed one, means are provided for measuring a fixed interval after the sensing of the alpha symbol, at the end of which time a beta symbol is generated and written on the new tape. This apparatus, as previously pointed out, is called a beta symbol generator. Upon writing the beta symbol, And gate 524 is enabled to set flip-flop 526, which is the proportional spacing flip-flop, and enables the allotment of space for item activity for a "U" account. Flip-flop 506 is reset by a signal applied from an And gate 540, which receives not only the beta generator output signal but also the output of the symbol senser indicative of the fact that a "U" symbol has been sensed. The output of And gate 540 is applied to Or gate 518, the output of which is used to reset the flip-flop 506. The old tape is directed to come to a halt before the next account by the one state of flip-flop 538. It should be noted that flip-flop 538 is reset upon the alpha symbol reverse output being provided from the symbol senser. The new tape will be brought to a half after the spacing for the "U" accounts has been made.

The remaining situation to be treated is the operation of the apparatus when a "D" account occurs. With both tapes stopped, flip-flop 506 is set so that when the tapes commence running forward, copying of the alpha symbol account number and "D" symbol may occur. Flip-flop 510 is set upon the alpha symbol being read. When the "D" symbol is sensed by the symbol senser, then an And gate 542 is enabled upon the occurrence of the next clock pulse to set a flip-flop 544, which may be called the "D" account spacing flip-flop. If the "D" account was previously a commercial account which had been inactivated during the month, the old tape will have the appearance of 112 in Figure 1, wherein is shown that the data following the "D" symbol consists of a lambda indicative of the name and address, followed by the name and address.

The sensing of the lambda symbol is applied from the symbol senser to an And gate 546. The output of this And gate is applied to the Or gate 528, which functions in the manner previously described to set flip-flop 538. The second required input to the And gate 546 is provided by the one state of flip-flop 544. Both the one state of the flip-flop 538, as well as the one state of the flip-flop 544 are applied to an And gate 548 also. At a suitable time after the lambda symbol has been sensed, an output is derived from the counter 316 in Figure 3 which enables And gate 548 to apply an output to a cathode follower 550, which in turn resets flip-flop 506 through Or gate 522. This serves to terminate the transfer of data from the old tape to the new tape and insures that none of the name and address information is copied onto the new tape.

Since the beta generator is not actuated, flip-flop 526 will not be set. Flip-flop 538 operates to bring the old tape to the next account number and stop it there. The one state of flip-flop 544, together with the zero state of flip-flops 506, are combined to signal the new-tape-control apparatus to bring the new tape to a stop. Thus, the new tape is brought to a stop after all the data required for a "D" account has been transferred, and no additional space is allotted.

Figure 6:
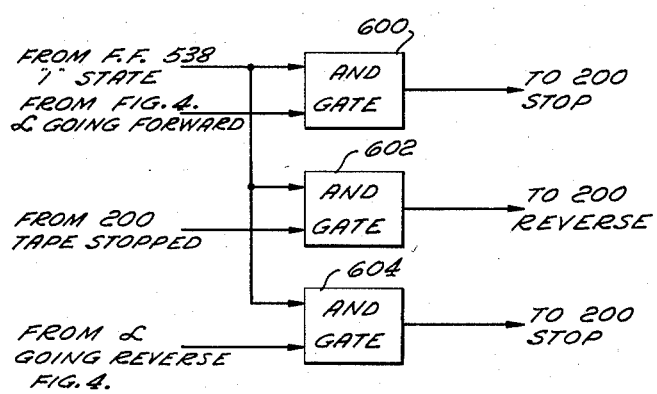
Figure 6 shows a block diagram of the logic for controlling the motion of the tape from which spacing is being determined.

Figure 6 is a block diagram of the logic required to instruct the old-tape-control apparatus to move the old tape forward until it has read the next alpha, to stop, to then reverse its motion until it has read the alpha of the new account again while going in reverse, and then to stop.

Figure 6 shows the logic employed for controlling the old-tape-control apparatus. An And gate 600 receives as its input the output of flip-flop 538 in its one state. Likewise, And gates 602 and 604 receive this output. A second required input to And gate 600 is from the "symbol-senser-alpha-going-forward" output. The output of this And gate is then applied to the old-tape-control apparatus 200, to instruct it to stop the forward motion of the tape. The second required input to And gate 602 is an output from the old-tape-control apparatus 200, indicative of the fact that the tape has stopped. Thereupon, the output of the And gate 602 instructs the control apparatus to reverse the motion of the tape. The second required input to And gate 604 is the output of the symbol senser indicative of "alpha-going-reverse." Thereupon, the output of And gate 604 is applied to the tape-control apparatus to instruct it to stop the forward motion of the tape.

Figure 7:
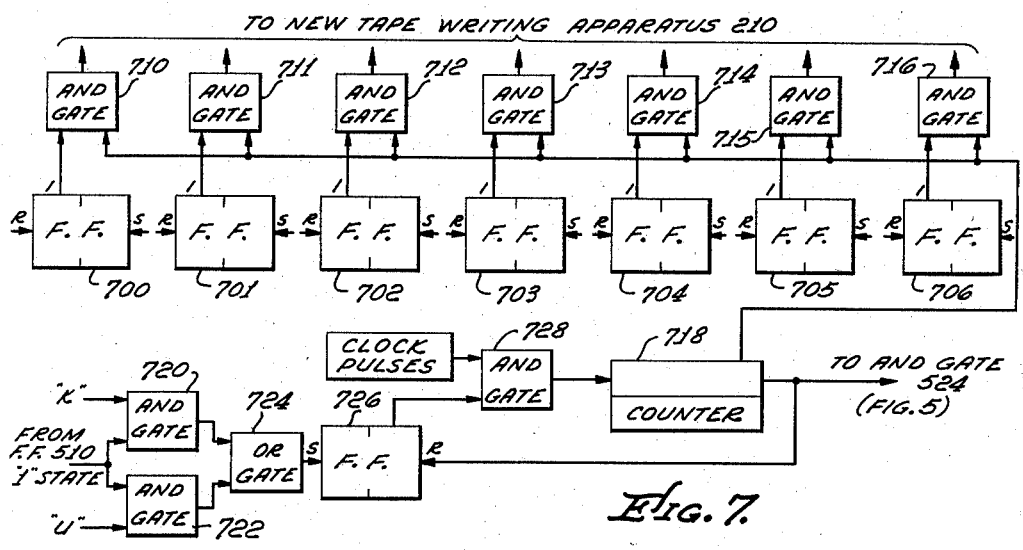
Figure 7 shows a block diagram of a symbol generator employed in the embodiment of the invention.

Figure 7 shows the operation of the beta generator in conjunction with the apparatus shown in Figure 5. Seven flip-flops 700 through 706 have their set and reset conditions established, either by signals applied to their inputs from automatic or manual switches so that their outputs represent the beta symbol, which from the table previously shown in binary code, is 0000101. Their outputs are respectively applied to And gates 710 through 716. These And gates require as a second input the output of a counter 718. This counter is enabled to count when a "K" or a "U" symbol is sensed, in conjunction with the flip-flop 510 being in its one state. Accordingly, and And gate 720 has as one required input the output of the symbol senser shown in Figure 4 when it senses the symbol "K" and also the output of flip-flop 510 in its one state. A second And gate 722 requires in order to provide an output, first, the input from the symbol senser when it senses the symbol "U" and, second, the output of the flip-flop 510 in its one state. Both these And gates have their outputs connected to a common Or gate 724, the output of which is applied to a flip-flop 726 to set it. When this flip-flop is set, it provides a first input to an And gate 728, which has as its second required input clock pulses from the source 314 for this computer system. The counters can then proceed to count the clock pulses and thus measure the interval required for the old tape to pass through the region allotted for writing name and address information. At the end of this measured interval, the output of the counter is applied to all the And gates 710 through 716. These And gates are thus enabled to transfer the outputs from the flip-flop 700 through 706 to the new-tape-writing apparatus 210 to be written on the new tape. It should be noted that all the And gates are connected to the one output side of the flip-flops. When a flip-flop is in its set condition, the one output side is usually positive; when it is in its reset condition, the one output side is usually negative. Thus, flip-flops 704 and 706 will be driven to their set conditions and the remaining flip-flops will be left reset. The output of the And gates will accordingly represent the beta symbol. The energizing output from the counter to the And gates is not the last count of the counter. The counter is proceeded to count further an amount to insure that the beta symbol is written. This last count of the counter after the writting of the beta symbol is employed to reset the flip-flop 726 and is also applied to And gate 524, the output of which is used to set the proportional spacing flip-flop 526. Accordingly, the beta symbol is written in the position at which it indicates the end of the name and address space and the beginning of the item activity space. Thereafter, the proportional spacing flip-flop 526 assumes control.

Figure 8 is a block diagram of the proportional spacing apparatus in accordance with this invention. As previously pointed out, the theory of the operation of this system requires the measurement of the activity space used on the old tape. This is measured by a valve accumulated in a register. The number in the register is periodically incremented by a fixed amount by means of an arithmetic unit as the old tape moves from the beginning of the item-activity space until the last item. At that time, the new tape which is running concurrently with the old tape is permitted to continue to run forward for the time which the arithmetic unit takes to reduce the sum which has been generated to zero. The method of this sum reduction is by periodically subtracting a second fixed number from the sum. Obviously, the proportionality of the space allocated is determined by the size of the decrementing number relative to the incrementing number. A further fixed space is allocated by permitting the arithmetic unit to generate an additional sum of a predetermined value. The new tape is then stopped.

The arithmetic unit 800, which is represented by a block in Figure 8, is a well-known circuit and is described and shown, for example, on pages 284 et seq. of the text High-Speed Computing Devices, by the staff of Engineering Research Associates, Inc., which was published by the McGraw-Hill Book Company in 1950. It has two data inputs, respectively designated as data A and data B, which represent the inputs of the numbers to be added or subtracted. It has two control inputs, respectively labeled "add" "subtract," which when energized instructs the arithmetic unit to operate accordingly. It has a sum output which provides the result of the arithmetic process. In addition, two cyclic counters are required. One of them 802 has a total count capacity of five and the respective counting states are labeled m, n, p, q, r. The other of them 804 has a total count capacity of 17 and is advanced by every fifth count output of the counter 802. The pulses for driving counter 802 are derived from the clock pulse source and the counter 804 is advanced in response to the fifth count, or r-count stage, of the counter 802 and is also synchronized by the clock sync pulses.

When the symbol generator in Figure 4 senses a beta symbol on the old tape, an Or gate 806 is enabled to apply an output to reset a flip-flop 808. When this flip-flop is in its reset state, it applies an output to the arithmetic unit 800 to cause it to add incoming data. The reset condition of the flip-flop 808 is also applied to an And gate 810. A second required input to this And gate 810 is received from a decimal-one generator 812, and the third required input to this And gate is received from a flip-flop 814 when in its set condition.

Flip-flop 814 is set by input received from flip-flop 526 when in its one state (this is the proportional spacing control flip-flop in Figure 5) which is applied to an Or gate 816 and through the Or gate to an And gate 820. The output of the And gate is employed to set the flip-flop 814. And gate 820 has as two of its other required conditions, first, a pulse from the clock-pulse source, and, second, an input from the two counters 802 and 804 which is designated as 7r. The "r" represents the last state of the counter 802 and the "7" represents the seventh counting state of the counter 804. When these two states are reached, then And gate 820 can set flip-flop 814. Upon this condition being attained, then the decimal-one generator can transfer a decimal one through an Or gate 822 into the data "B" input to the arithmetic unit 800.

Since the arithmetic unit has been instructed to add and there is no input on the data "B" terminal, the output of the arithmetic unit at this time is a decimal one. This is applied at the sum output to an Or gate 824. The output of the Or gate is applied to a register 826. The register 826 stores the output of the arithmetic unit. The output of the arithmetic unit is also sensed to determine if it is negative. If the last digit of the number coming out of the arithmetic unit is a nine, then this is indicative of the fact that the number is negative.

It should be noted that the one state of flip-flop 814 is applied to a shift pulse generator 828 through an Or gate 815, which enables the register R4 to shift the data being applied to its input into the register. The time that the shift pulse generator operates is a function of the time during which flip-flop 814 is permitted to be in its set condition. This time is defined by the input to the And gate 830, the output of which is connected to the reset input terminal of the flip-flop 814. This And gate has as one input a clock pulse and as the second input output from the counter designated as 1r. As previously pointed out, this means the fifth state of counter 802 in the first counting state of counter 804. Therefore, flip-flop 814 is permitted to remain set from 7r time until 1r time.

The one state of flip-flop 814 is also applied to an And gate 832. A second required input to this And gate is the clock pulse, and the third required input to this And gate is the 8r count of the counters. The output of And gate 832 sets flip-flop 834, which enables And gate 836. The second required input to And gate 836 is provided by the one output of flip-flop 814 and the third transmitted input to And gate 836 is the output of a decimal-zero generator 838. The output of And gate 836, thus, is a decimal zero, which is applied to the Or gate 822.

In order to recapitulate the operations described, it should be noted that upon the generation of a beta symbol, flip-flop 808 is set so that the arithmetic unit is instructed to add. As a result of the operation of flip-flop 526, flip-flop 814, upon the occurrence of 7r time, is set. This flip-flop remains set until counter 804 has completed the remainder of the cycle. Upon the occurrence of 8m through r time, And gate 810 is permitted to enter a decimal one in the least-significant digit position of a number into the arithmetic unit. Upon the occurrence of 8r time, the flip-flop 834 is set in its one state, whereupon decimal-zero generator 838 can enter decimal zeros through And gate 836 and Or gate 822 into the arithmetic unit which follow the decimal one previously entered. Of course, the number of zeros that are entered are dependent upon how long the decimal-zero generator is permitted to enter zeros into the arithmetic unit. This is measured by the length of time that the flip-flop 814 remains set. Since the decimal-zero generators are entered during nine counts, there will be nine decimal zeros entered following the decimal one. Since no data is being entered into the data A terminal, the input to the data B terminal is transferred through the sum-output terminal into the register 826, which has shift pulses applied thereto as the result of flip-flop 814 remaining in its one state.

The register is filled with a one followed by a string of zeros at the time that flip-flop 814 is reset at 1r time. However, as long as flip-flop 526 remains in its one state, indicative of the fact that items are still being read by the reading heads on the old tape, at 7r time flip-flop 814 is set, enabling the shift-pulse generator to apply shift pulses to register 826 to shift out its contents, which are then entered into the data A input of the arithmetic unit 800. While this is occurring, a one, followed by zeros, is being inserted at the data B input. Therefore, the sum terminal will have the contents of the register, plus the number being entered into the data B input. This sum is inserted into the register again.

For as long as flip-flop 526 remains in its one state, which is until the last item has been sensed, register 826 will keep on entering its contents into the data A terminal of the arithmetic unit to be added to the decimal-one input which is inserted through the data B input terminals. Thus, a sum is generated which is representative of the spacing required on the old tape for its item activity. The number in the register which is the sum will continue to increase linearly with time.

When the last item output is received from the counter 324 in Figure 3 and, further, upon the receipt of the next clock pulse, an And gate 860 is enabled to set a flip-flop 842, which can be designated as the end-item space flip-flop. The one output from this flip-flop is applied to an And gate 844, which also receives as other required inputs the one state input from flip-flop 526 and an input at 7r time of the counters 802 and 804. This And gate 844 then sets flip-flop 808, whereupon the arithmetic unit is instructed to subtract the inputs thereto.

In the subtract mode, flip-flop 808 will enable the decimal-three generator to inject a decimal three through And gate 846 to the data B terminal of the arithmetic unit. The decimal-zero generator, as before, injects decimal zeros, which follow the decimal three into the arithmetic unit. Accordingly, the decimal three is at the least-significant position, followed by a string of zeros. Flip-flop 814 continues to operate as before, being set at 7r time and reset at 1r time. However, this time the value in the register 826 has subtracted from it the value inserted in the data B terminal of the arithmetic unit periodically. The result is that the output of the arithmetic unit is decreased each time. This value continues to be decreased until the nine senser 848 detects that the most-significant digit position is a nine, indicative of the fact that the value of the number being provided by the sum output of the arithmetic unit is less than zero. The nine senser output at this time is then applied to an And gate 850, which also receives the output from the one side of flip-flop 814 and a pulse at 17r time. The output of And gate 850 is applied to a succeeding And gate 852, which, upon receiving the next clock pulse, is enabled to reset the flip-flop 808 through Or gate 806. This then switches the arithmetic unit to the "add" mode.

At this time it should be noted that the sum was decreased at a much more rapid rate than it was built up. Accordingly, since the new tape is continuing to run forward, the spacing allotted is a percentage of the spacing on the old tape which was actually used for item activity.

The output of And gate 850 is also applied to an And gate 854. And gate 854 has as its second required input the one output of flip-flop 526. Accordingly, the output of And gate 854 is applied to an Or gate 856 and another And gate 860, so that when the next clock pulse is applied to And gate 860 flip-flop 862 is set. Flip-flop 862 may be called the fixed-space flip-flop. The one output of this flip-flop is applied through the Or gate 816 and And gate 820 to maintain the flip-flop 814 operating. That is, flip-flop 814 continues to be set and reset at 7r and 1r times, as before, even though the input thereto from flip-flop 526 one state may be removed.

The one state of flip-flop 862 is also used to prime two And gates 864, 866. A second required input to And gate 864 is an input which indicates a "K" account from the symbol senser; the second required input to And gate 866 is one which indicates that there is a "U" account. This input is also received from the symbol senser. The third required input to these two And gates is received from a circuit 868, which is called the 50 and 200 senser. Upon the sum of 50 being sensed at the output of the arithmetic unit, this circuit applies an output to And gate 864, and upon the sum of 200 being sensed at the output of the arithmetic unit this circuit applies an output to the And gate 866.

Since flip-flop 808 is now in the add mode and flip-flop 814 is now being set and reset at 7r and 1r time, the arithmetic unit is now building up a sum by operating in the same manner as was described previously when the item space on the old tape was being measured. This sum increases until it reaches the value 50. At this time, the circuit 868 provides an output which enables And gate 864 to emit an output. This output is applied to an Or gate 870. The output of Or gate 870 is employed to instruct the tape-control apparatus to stop the new tape motion and to reset flip-flop 862 to stop the fixed space activity.

The net spacing effect with a commercial, or "K" account, is that first of all space is assigned on the new tape for activity which is equal to the actual activity space occupied on the old tape, plus a certain amount which is fixed, so that if the commercial account activity was small or missing for the previous month, at least a minimal activity space is provided for the succeeding month's activity, and in addition a percentage of the old-tape-activity space is also provided. In the case of the "U" account, an And gate 872 has applied as one input the symbol senser output indicative of the fact that the "U" account symbol was seen on the old tape. The second input to this And gate is the signal indicative of the fact that the beta was written on the new tape. The output of the And gate 872 is applied through the Or gate 856 and And gate 860 to set flip-flop 862. This results in enabling, as previously described, the setting and resetting of flip-flop 814. This, in turn, energizes the shift pulse generator to enable the register to receive the sum output of the arithmetic unit and then shift it back into the data A input of the arithmetic unit. This also sets the flip-flop 808 to its add mode and thus the decimal-one and decimal-zero generators are enabled to periodically add one to the injected contents of the register 826.

Such addition continues until the circuit 868, which senses 50 and 200, can sense the 200. At this time, the And gate 866 is enabled to provide an output through the Or gate 870 to stop the tape motion and reset flip-flop 862. Thus, a fixed space is allotted after a beta for a "U" account, to provide room for the succeeding month's activity, if and when this account is assigned to a depositor. The apparatus shown in Figure 8 is not called upon when a "D" account is set.

In order to condition the register 826 to receive new numbers, and And gate 879 is enabled to set a flip-flop 880 when an alpha symbol is sensed and a clock pulse occurs. The set output of the flip-flop 880, a clock pulse, and the occurrence of 7r time enable and And gate 881 to set a flip-flop 882. This flip-flop 882, in its set condition, enables and And gate 390 to pass signals representative of zeros which are received from a zero generator 884 (shown in Figure 9) the output of And gate 890 consisting of zeros is inserted through Or gate 824 into the register 826. These zeros take the place of the information previously stored in the register and, since the arithmetic unit is not operating at the time, the number being transferred out of the register is dissipated and replaced instead by zeros. To enable the register to function, the output of the flip-flop 882 is applied through a cathode follower 886 and through Or gate 815 to energize the shift pulse generator 828. Flip-flops 880 and 882 are reset upon the occurrence of the next 1r time, which accordingly energizes and And gate 888 to reset the flip-flop. Since the account number symbol alpha is seen at the beginning of every account, the register is left in condition to be used to properly measure the interval of the old-tape-item activity, or provide a fixed space for the "U" accounts. The shift register of the type employed in this invention is well known circuitry and is found described and shown, for example, in the magazine Electronics, on pp. 181–184, by Stevens & Knapton, entitled Gate Type Shifting Register, published November 1949.

The decimal-one decimal-zero generators and decimal-three generator shown in Figure 8 are well known configurations of the general type shown in Figure 7. In this figure it should be noted that five-bit numbers are used and, in the preferred embodiment of the invention, the excess-three code was employed. This is a binary code where every number is expressed three numbers higher than in the usual binary code. Therefore, the decimal-zero in the excess-three binary code is actually decimal-three in the normal binary code. Decimal-one in the excess-three binary code is actually decimal-four in the normal binary code. Decimal-three in the excess-three code is decimal-six in the normal binary code.

Figure 9:
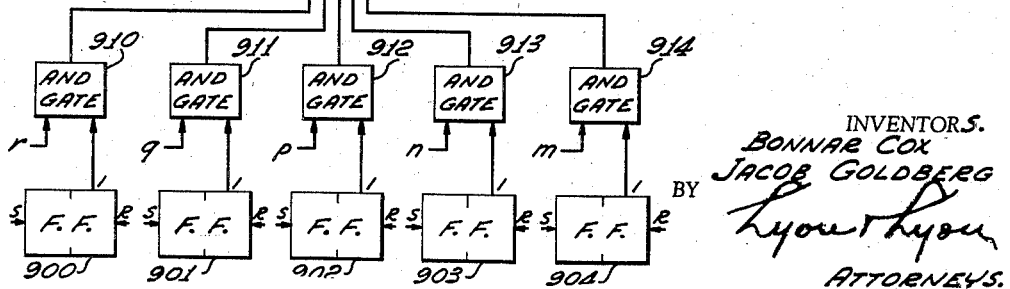
Figure 9 is a block diagram of a decimal digit generator suitable for use in the embodiment of the invention.

For the circuit shown in Figure 8, a five-binary-bit code was employed; thus, as shown in Figure 9, the decimal-zero generator consisted of five flip-flop circuits 900 through 904 and to represent the excess-three decimal-zero, flip-flops 903 and 904 were set and flip-flops 900 and 901, and 902 were reset. The one outputs of the flip-flops 900 through 904 were respectively connected to the And gates 910 through 914. The second required input to these And gates consisted of the outputs of the counter 802 for the respective count stages. These are indicated by m, n, p, q, r leads being connected as the second required inputs to the And gates 910 through 914. Therefore, the output of the decimal-zero generator are five bits in serial form with the least-significant digit in the decimal-zero representation occurring first.

The output of all the And gates is applied to the Or gate 916. The output of the Or gate is applied either to the And gate 836 or to the And gate 890, as required. The output is a series of positive and negative voltages representative of the decimal-zero in excess-three code.

The decimal-three generator and the decimal-one generator have the identical circuitry as that shown in Figure 9. The exception, of course, is that the flip-flops 900 through 904 are set and reset in the respective cases to provide as their outputs a decimal-three or a decimal-one.

The circuitry for the nine senser, the 50 and 200 senser, may be substantially the same as that shown in Figure 4 for the symbol sensers. Of course, the logical arrangements will differ for the purpose of detecting the numbers 9, 50, and 200, in place of the symbols. However, advantage may be taken of the fact that all that is sought to be detected is a nine in the highest-significant digit position, a five in the tens digit position, and a two in the hundreds digit position to considerably simplify the required circuitry. The numbers coming out of the arithmetic unit are in serial order, least-significant digit first.

Figure 10:
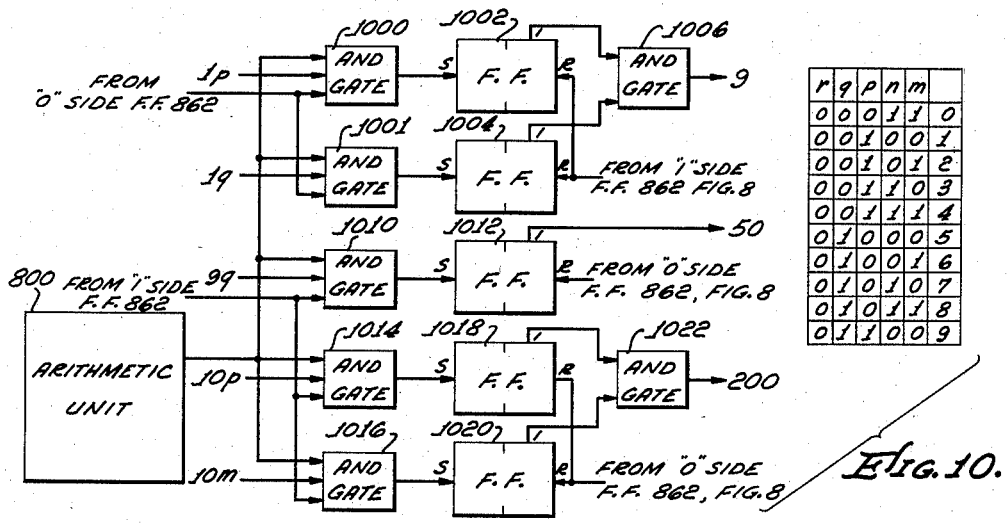
Figure 10 is a block diagram of a number senser employed in the embodiment of the invention.

An arrangement for sensing the 9, 50, and 200 is shown in Figure 10. In Figure 10 there is also shown a table showing the excess-three code for the values from zero to nine. It will be appreciated that when an excess-three binary coded decimal system is employed, in each decimal position in a decimal number the excess-three binary representation is employed. Thus, for example, in order to show or represent the decimal number 50 in excess-three binary code, in the least-significant decimal position the value zero as shown in the table in Figure 10 is employed, and in the tens position the value five is shown in the table as employed. In order to detect whether there is a nine in the most-significant position of the sum which is being received from the arithmetic unit, all that is necessary is to turn on And gates at that time which will correspond to the presence of the two ones in the positions which are designated in the table as q and t.

It should be recalled that counters are employed to operate the system (counters 802 and 804). The binary bits are timed by the counter 802, which runs through the m, n, p, q, r counts for every advance of counter 804. Therefore, the advance of counter 804 marks each decimal digit and the advance of counter 802 times the advance of each binary bit in a decimal digit. Thus, in order to sense the occurrence of a nine in a most-significant position, And gate 1000 is employed. One input to this And gate is the output from the zero side of flip-flop 862, which is indicative of the fact that no fixed spacing is occurring at that time. A second And gate 1001 is also employed and also has the same input thereto. And gate 1000 requires as the second input a 1p signal from the counters 802, 804. The third input thereto, which is the only one which will enable this And gate to emit an output, is provided when the one emanates from the arithmetic unit in the p position within the decimal digit. Similarly, an output from And gate 1001 occurs only when a one is received within the q position within the binary decimal digit.

The output of the And gates 1000 and 1001 respectively set flip-flop circuits 1002 and 1004. The outputs of these flip-flop circuits, when in their set condition, are employed to set an And gate 1006. Therefore, when And gate 1006 provides an output, it is indicative of the fact that a nine has been sensed in the highest-significant position of the output sum of the arithmetic unit. The two flip-flops are reset when the fixed-spacing flip-flop 862 assumes a one state.

The output of the arithmetic unit is also applied to another And gate 1010, which also has as an input the output of flip-flop 862 when in its one state. At 9q count time, which, referring to the table, occurs when a 50 would be shown in the output of the arithmetic unit, And gate 1010 is enabled. If this And gate is enabled at that time, indicative of the fact that a 50 has been sensed, then the flip-flop 1012 is set. This flip-flop is reset from the zero side of flip-flop 862.

And gates 1014 and 1016, together with flip-flops 1018 and 1020, are employed to identify when the symbol, or number, 200 is found in the arithmetic unit. At 10p time and also at 10m time, when the representation of two in the hundreds position exists at the output of the arithmetic unit, And gates 1014 and 1016, which also have as another required input the output of the one side of flip-flop 862, are enabled respectively to set flip-flops 1018 and 1020. The set outputs of these flip-flops are sensed by an And gate 1022, and its output accordingly represents the fact that the number 200 has been sensed. These two flip-flops 1018 and 1020 are also reset when the flip-flop 862 is in its reset state, indicative of the fact that proportional spacing is over.

There has accordingly been described and shown above a novel, useful, system for allocating space on one tape from an activity which has occurred on another tape. Also shown are arrangements for preserving space for activity on the new tape in the event that an unknown prior history of activity has occurred. It should be noted that although the apparatus and the terminology employed are applicable to activities found in the banking business, this is not to be construed as a limitation upon this invention, since inventory control systems and insurance activities may also employ the same arrangement without departing from the spirit and scope of this invention.

Attention is called to the fact that although in the description of the invention a decimal one is periodically added to generate the sum which measures the item activity space, other numbers may be employed, and also other numbers may be employed for reducing the value of the sum to provide any desired proportionality. If, for example, there are different types of active or commercial accounts for which different types of proportional or additional spacing is required, then it is possible to select any one of a number of number generators to change the desired proportional spacing.

We claim:

1. A system for allotting space on a first recording medium for recording future activity of a plurality of different accounts based on their past activity recorded in activity regions in a second recording medium comprising means to measure the space used in said second recording medium for the activity for an account, means for allotting the same space for recording future item activity for said account on said first recording medium, means to establish a predetermined percentage of the measured activity space, and means to allot said predetermined percentage of space to said account on said first recording medium in addition to the space previously allotted.

2. A system for allotting space on a first recording medium for recording future activity of a plurality of different accounts based on their past activity recorded in activity regions on a second recording medium comprising means for moving both recording media forward together, first means for sensing the beginning of an activity region for an account on said second medium, means responsive to said first means for sensing for identifying the beginning of an activity region on said first medium, second means for sensing the end of activity in said activity region on said second medium, means to measure the interval elapsing between the operation of said first and second sensing means, means to measure a predetermined percentage of said interval, and means to stop said first medium to establish the end of an activity region upon the end of said predetermined percentage of said interval.

3. A system for allotting space on a first tape for recording future activity of a plurality of different accounts based on their past activity recorded in activity regions on a second tape comprising means for moving both tapes forward, first means for sensing the beginning of an activity region for an account on said second tape, means responsive to said first means for sensing for identifying the beginning of an activity region on said first tape, second means for sensing the end of activity in said activity region on said second tape, means activated responsive to said first sensing means and inactivated responsive to said second means for sensing to generate a number representative of the interval between activation and inactivation, means for establishing an interval of time equavalent to a predetermined percentage of said number, and means for stopping said first tape at the end of said established interval of time to establish the end of an activity region on said first tape.

4. A system for allotting space on a first tape for recording future activity of a plurality of different accounts based on their past activity recorded in activity regions on a second tape comprising means for moving both tapes forward, first means for sensing the beginning of an activity region for an account on said second tape, means responsive to said first means for sensing for identifying the beginning of an activity region on said first tape, second means for sensing the end of activity in said activity region on said second tape, means activated responsive to said first sensing means and inactivated responsive to said second means for sensing to generate a number representative of the interval between activation and inactivation, means for periodically reducing said number by a predetermined factor, and means responsive to said number being reduced below a zero value to stop said first tape to establish the end of an activity region on said first tape.

5. A system as recited in claim 4 wherein said means to generate a number representative of the interval between activation and inactivation includes means to generate a percentage of said number, and means for increasing said integral periodically by percentage amounts during the interval between activation and inactivation.

6. A system for allotting space on a first tape for recording future activity of a plurality of different accounts based on their past activity recorded in activity regions on a second tape comprising means for moving both tapes forward at substantially the same speed, first means for sensing the beginning of an activity region for an account on said second tape, means responsive to said first means for identifying the beginning of an activity region on said first tape, second means for sensing the end of activity in said activity region on said second tape, means to generate a first number means to increase said first number periodically by itself during the interval between sensing by said first and second means to establish a sum, means to generate a second number, means to periodically subtract said second number from said sum to produce a difference, third means to sense when said difference becomes negative, and means responsive to said third means to sense to thereafter stop said first tape after a predetermined interval to establish the end of an activity region on said first tape.

7. A system for allotting space on a first tape for recording future activity of a plurality of different accounts based on their past activity recorded in activity regions on a second tape comprising means for moving both tapes forward at substantially the same speed, first means for sensing the beginning of an activity region on said second tape, means responsive to said first means for marking the beginning of an activity region on said first tape, second means for sensing the end of activity in said activity region on said second tape, means to generate a first number, an arithmetic circuit for performing addition and subtraction, means for applying said first number periodically to said arithmetic circuit to be added to itself during the interval between sensing by said first and second means to establish a sum representative of said interval, means to generate a second number, means to apply said second number periodically to said arithmetic circuit to be subtracted from said sum to produce a difference, third means to sense when said difference becomes negative, means to generate a third number, means responsive to said third sensing means to apply said third number periodically to said arithmetic circuit to be increased by its own value until a predetermined sum is reached, and means responsive to this predetermined sum being reached to stop said first tape to thereby establish the end of the activity region for said account.

8. A system for allotting space on a first tape for recording future activity of a plurality of different accounts based on their past activity recorded in activity regions on a second tape, each account on said second tape having account-identifying data, an account classification symbol indicating an account as active, inactive, or to be activated, and where warranted by the account classification a symbol indicative of the commencement of the region of activity followed by a space allotted for activity, said system comprising, means for running both tapes forward at substantially the same speed, means for transferring account-identifying data and its account classification symbol to said first tape, means for sensing said account classification symbol, means responsive to the symbol sensed indicating said account is inactive to stop said first tape immediately after transfer of said account-identifying data and symbol, means responsive to the symbol sensed indicating an account is to be activated to stop said first tape at a predetermined interval after the transfer of said account-identifying data and symbol, and means responsive to the symbol sensed indicating an active account to measure the interval required by said second tape to pass through the recorded activity for said account, and means to stop said first tape after a predetermined percentage of said measured interval has elapsed to allot space for future activity.

9. A system as recited in claim 8 wherein said means responsive to the symbol sensed indicating an account is to be activated to stop said first tape at a predetermined interval after the transfer of said account-identifying data and symbol includes an arithmetic circuit, means to generate a first number, means to periodically apply said first number to said arithmetic circuit to be added to itself, means responsive to the sum output from said arithmetic circuit attaining a predetermined value to provide a signal to stop said first magnetic tape.

10. A system as recited in claim 8 wherein said means responsive to the symbol sensed indicating an active account to measure the interval required by said second tape to pass through the recorded activity for said account includes an arithmetic circuit for performing addition and subtraction, means for generating a first number, first means for sensing the symbol indicative of the beginning of the activity regions, second means for sensing the end of activity within said region, and means for applying said first number periodically to said arithmetic circuit to be added to itself during the interval between sensing by said first and second means to establish a sum representative of said interval.

11. A system as recited in claim 10 wherein said means to stop said first tape after a predetermined percentage of said measured interval has elapsed includes means to generate a second number, means to apply said second number periodically to said arithmetic circuit to be subtracted from said sum to produce a difference, third means to sense when said difference becomes negative, means to generate a third number, means responsive to said third sensing means to apply said third number periodically to said arithmetic circuit to be increased by its own value until a predetermined sum is reached, and means responsive to this predetermined sum being reached to stop said first tape to thereby establish the end of the activity region for said account.

No references cited.